United States Patent
Kobayashi

[11] Patent Number: 5,903,818
[45] Date of Patent: May 11, 1999

[54] RADIO PAGING SYSTEM FOR IMPROVING MESSAGE RECEIVE RATIO BY REDUCING INTERMODULATION NOISE

[75] Inventor: Yasuhiro Kobayashi, Tokyo, Japan

[73] Assignee: NEC Corporation, Tokyo, Japan

[21] Appl. No.: 08/977,945

[22] Filed: Nov. 24, 1997

Related U.S. Application Data

[63] Continuation of application No. 08/365,434, Dec. 28, 1994, abandoned.

[30] Foreign Application Priority Data

Dec. 28, 1993 [JP] Japan .................................. 5-336605

[51] Int. Cl.$^6$ ...................................................... H04B 1/10
[52] U.S. Cl. ...................... 455/38.1; 455/250.1; 455/254; 455/295; 455/308; 455/63
[58] Field of Search ............................. 455/249.1, 250.1, 455/254, 234.1, 234.2, 239.1, 244.1, 295, 308, 309, 193.1, 194.2, 38.1, 63, 38.3; 340/825.44; 370/905, 498, 345

[56] References Cited

U.S. PATENT DOCUMENTS

| | | | |
|---|---|---|---|
| 4,817,198 | 3/1989 | Rinderle .................................. | 455/295 |
| 5,144,296 | 9/1992 | DeLuca et al. .................... | 340/825.44 |
| 5,170,392 | 12/1992 | Riordan ................................... | 455/295 |
| 5,369,799 | 11/1994 | Tsunoda ............................... | 455/234.1 |
| 5,448,774 | 9/1995 | Yokozaki et al. ..................... | 455/234.1 |
| 5,507,022 | 4/1996 | Uomoto .................................. | 455/308 |
| 5,513,387 | 4/1996 | Saito et al. .......................... | 455/249.1 |

FOREIGN PATENT DOCUMENTS

| | | |
|---|---|---|
| 0 520 803 | 12/1992 | European Pat. Off. . |
| 2 285 327 | 7/1995 | United Kingdom . |
| WO 93/22848 | 11/1993 | WIPO . |

*Primary Examiner*—Nguyen Vo
*Assistant Examiner*—Lester G. Kincaid
*Attorney, Agent, or Firm*—Foley & Lardner

[57] ABSTRACT

A pager includes a radio frequency (RF) attenuator which is initially rendered inoperative and which initiates attenuation of an incoming RF signal in response to a control signal. An amplifier is coupled to amplify the output of the attenuator. A signal level monitor (24, 26), coupled to the amplifier, determines if the output of the amplifier exceeds a predetermined level. A demodulator (16) is coupled to reproduce a base band signal from the output of the amplifier. A controller, following the demodulator, attempts to establish bit sync during each of a plurality of conventional and intermittently executed preamble searches. If bit sync is not established in a given preamble search and if the level monitor indicates that the output of the amplifier exceeds the predetermined level, the controller applies the control signal to the attenuator for activating the attenuator. Further, the controller extends the given preamble search by a predetermined time period for further determining whether or not bit sync is established. The attenuator, once being energized, continues to attenuate incoming RF signals until a predetermined time period elapses and another high input signal is received without establishing bit sync.

2 Claims, 3 Drawing Sheets

(A) PREAMBLE | BATCH 1 | BATCH 2 | BATCH 3
PA | SC G₁ G₂ | G₈ SC G₁ | SC G₁

(B) ADDRESS | CHECK | MESSAGE | CHECK
CODEWORD | CODEWORD (C) MESSAGE NO. | DISPLAY POSITION | DISPLAY DATA

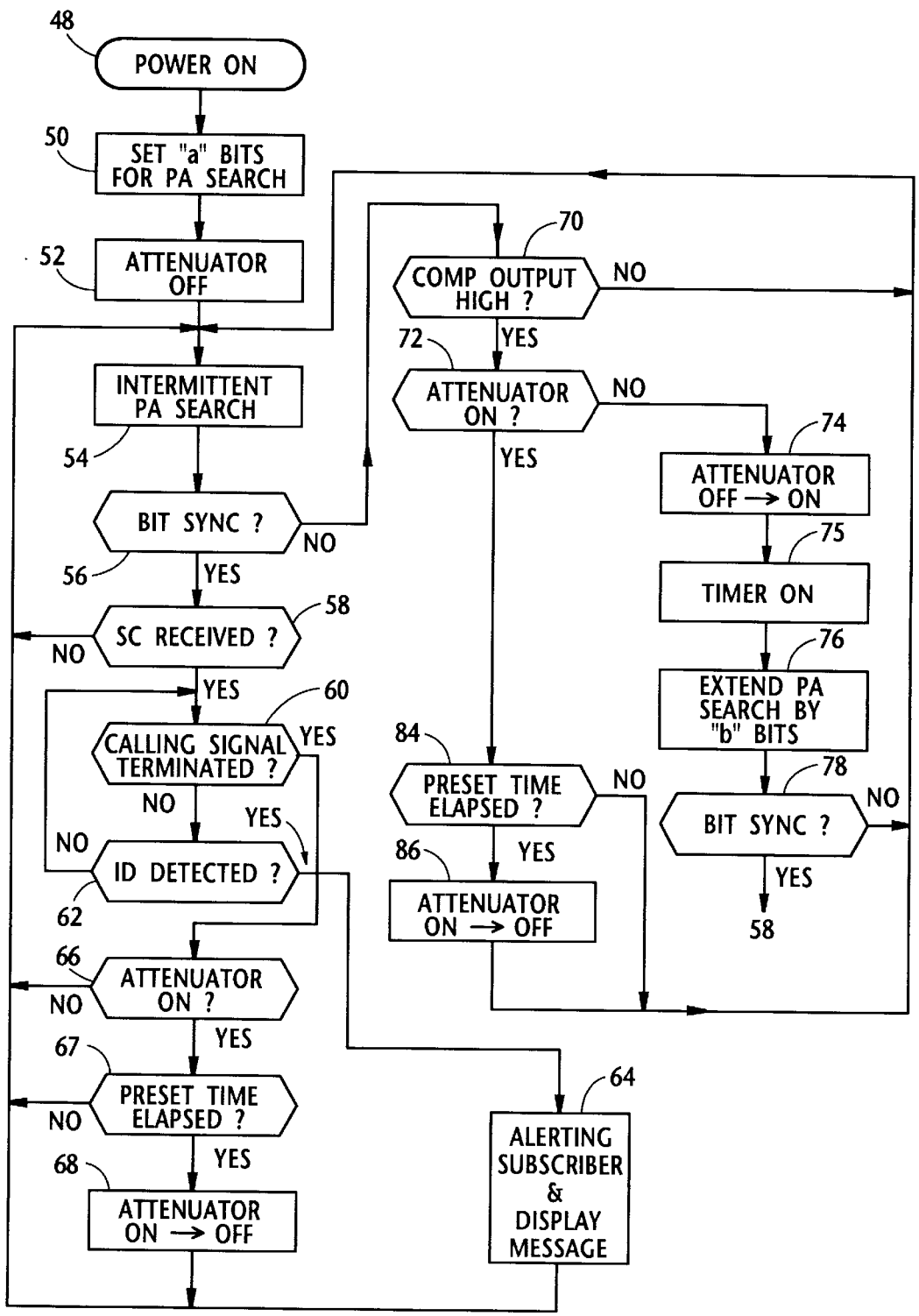

RADIO PAGING SYSTEM FOR IMPROVING MESSAGE RECEIVE RATIO BY REDUCING INTERMODULATION NOISE

This application is a continuation of application Ser. No. 08/365,434, filed Dec. 28, 1994, now abandoned.

BACKGROUND OF THE INVENTION

1. Field of the Invention

The present invention relates generally to improvements in a radio pager and more specifically to a method and apparatus via which a message receive ratio can be improved by reducing intermodulation noise induced in a radio pager.

2. Description of the Related Art

In order to meet the ever increasing number of pager subscribers in a radio paring system, a large number of radio channels (viz., frequencies) have been put into practical service. Further, a recent trend of introducing free competition in the radio paging business has brought about the possibility of an accelerated increase in the number of paging channels taking place.

With such an increase in the number of frequencies to be used in the same service area, a pager is liable to fail to receive a message(s) directed thereto due to intermodulation noise resulted from two high level carriers with different frequencies.

Throughout the instant disclosure, a desired frequency implies the frequency used to transmit a message to a pager in question, while an undesired or interfering frequency indicates the frequency which may cause intermodulation noise with the desired frequency. It is to be noted that the undesired or interfering frequency is in fact a desired frequency to a group of other pagers.

Even if a pager is located in a place wherein a desired frequency wave has electric field strength sufficient for a message to be received, it is often the case that the pager fails to receive the message if an undesired frequency wave also has a very high electric field strength.

One known approach to solving the aforesaid problem, is to automatically lower a RF signal level in response to the field strength of an incoming RF signal. As is known in the art, an attenuator, it not energized, passes therethrough a signal without attenuation. In other words, the attenuator always requires electric power to perform its attenuation operation. If attenuation is not needed, power is cut-off to the attenuator. It follows that the above prior art has encountered the problem that a battery life is undesirably shortened. In more specific terms, the attenuator is energized irrespective of whether or not an incoming signal is a desired signal. This means that the attenuator operates even when a desired signal is transmitted.

Additionally, if the auto gain control loop is not precisely adjusted, a desired frequency signal with a normal level can be undesirably lowered by the attenuator. This may lead to lowering of message receive ratio.

SUMMARY OF THE INVENTION

It is an object of the present invention is to provide a method of improving a message receive ratio by adaptively reducing intermodulation noise.

Another object of the present invention is to provide a method of improving a message receive ratio by temporarily extending a preamble search time immediately after energizing an attenuator.

Still another object of the present invention is to provide an apparatus for improving a message receive ratio by adaptively reducing intermodulation noise.

Another object of the present invention is to provide an apparatus for improving a message receive ratio by temporarily extending a preamble search time immediately after energizing an attenuator.

In brief, the above objects are achieved by a pager including a radio frequency (RF) attenuator which is initially rendered inoperative and which initiates attenuation of an incoming RF signal in response to a control signal. In an exemplary embodiment an amplifier is coupled to amplify the output of the attenuator. A signal level monitor, coupled to the amplifier, determines if the output of the amplifier exceeds a predetermined level. A demodulator is coupled to reproduce a base band signal from the output of the amplifier. A controller, following the demodulator, attempts to establish bit sync during each of a plurality of conventional and intermittently executed preamble searches. If bit sync is not established during a given preamble search and if the level monitor indicates that the output of the amplifier exceeds the predetermined level, the controller applies the control signal to the attenuator to activate it. Further, the controller extends the given preamble search by a predetermined time period for further determining whether or not bit sync is established. The attenuator, once being energized, continues to attenuate incoming RF signals for a predetermined time period.

More specifically, a first aspect of the present invention resides in a method of controlling a pager operation, comprising the steps of: attempting to establish bit sync at each intermittent preamble search; if bit sync is not established at a given preamble search, determining if an incoming radio frequency (RF) signal exceeds a predetermined level; and if said incoming RF signal exceeds said predetermined level, activating an attenuator for attenuating said incoming RF signal, and extending said given preamble search by a predetermined time period for further determining if bit sync is established.

A second aspect of the present invention resides in a method of controlling a pager operation, comprising the steps of: (a) attempting to establish bit sync at each intermittent preamble search; (b) if bit sync is not established at a given preamble search, determining if an incoming radio frequency (RF) signal exceeds a predetermined level; (c) if said incoming RF signal exceeds said predetermined level, initiating activation of an attenuator for a predetermined time period for attenuating incoming RF signals, and extending said given preamble search by a predetermined time period for further determining if bit sync is established; (d) if bit sync is established at step (c), entering into a subsequent pager identification search mode; and (e) if bit sync is not established at step (c), continuing to establish bit sync at subsequent preamble searches.

A third aspect of the present invention resides in a pager comprising: an antenna; an attenuator, coupled to said antenna, for initiating attenuation of a signal applied from said antenna for a predetermined time period in response to a control signal; an amplifier coupled to amplify output of said attenuator; a signal level monitor, coupled to said amplifier, for determining if output of said amplifier exceeds a predetermined level; a demodulator, coupled to said amplifier, for reproducing a base band signal; and a controller, coupled to said signal level monitor and said demodulator, for attempting to establish bit sync at each intermittent preamble search, said controller, if bit sync is not established at a given preamble search and if said signal level monitor indicates that the output of said amplifier exceeds said predetermined level, applying said control signal to said attenuator, and simultaneously extending said given preamble search by a predetermined time period for further determining if bit sync is established.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 3 is a flow chart which shows the steps which characterize the operation of the present invention.

DETAILED DESCRIPTION OF THE PREFERRED EMBODIMENTS

Figure 1:
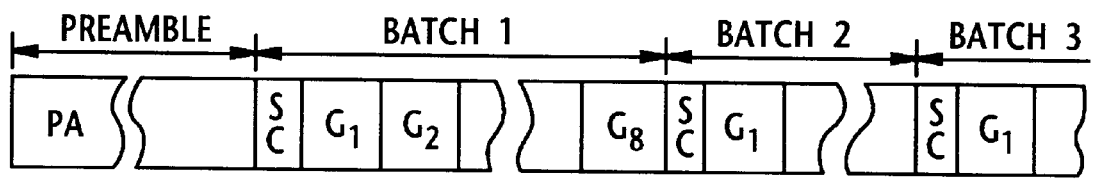
FIG. 1 shows a POCSAG type standard code format of the type to which the present invention is applicable.
Figure 1:
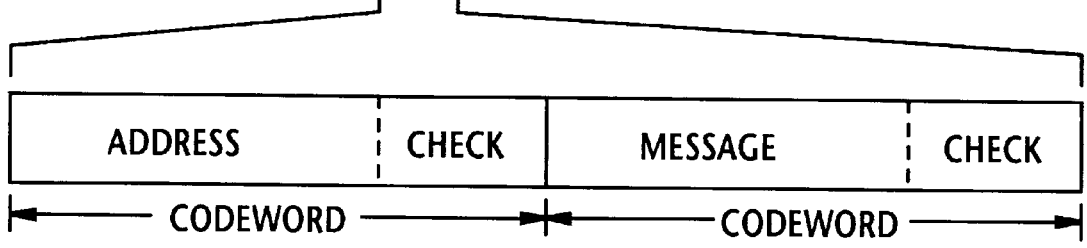
Figure 1:
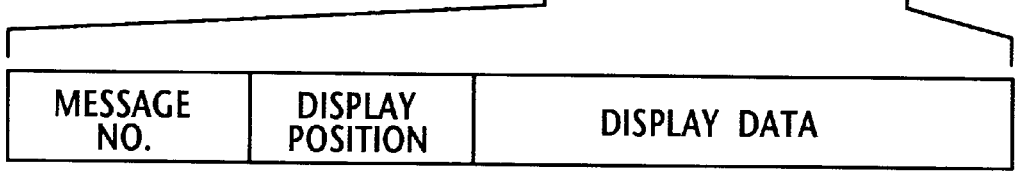

FIG. 1 is a schematic representation showing a standard code format proposed by the POCSAG (British Post Office Code Standardization Advisory Group). Although the present invention is not limited to such a code format, it is believed that a brief description thereof will facilitate an understanding of the present invention. According to the POCSAG specification, a transmission consists of a preamble PA followed by batches 1, 2, 3, . . . , each batch beginning with a sync code word (SC) as shown in part (A) of FIG. 1.

The transmission ceases when there are no further calls. Each transmission starts with a preamble to permit the recipient pager to attain bit sync and to prepare to acquire word sync (SC). The preamble PA is a pattern of reversals, 1010101 . . . , repeated for a period of at least 576 bits, i.e., the duration of a batch plus a code word. As shown in part (B) of FIG. 1, code words are transmitted in batches each of which comprises an SC followed by 8 groups or frames each containing 2 code words. According to the POCSAG, the number of message bits is 20.

FIG. 1 further shows, at part (C) thereof, in detail the message section (shown in part (H) of FIG. 1) which is divided into three parts; (a) a message number section (4 bits), (b) a display position (4 bits) and (c) a display data section (12 bits). It is to be noted that the just mentioned number of bits of each section is in no way limited thereto.

Figure 2:
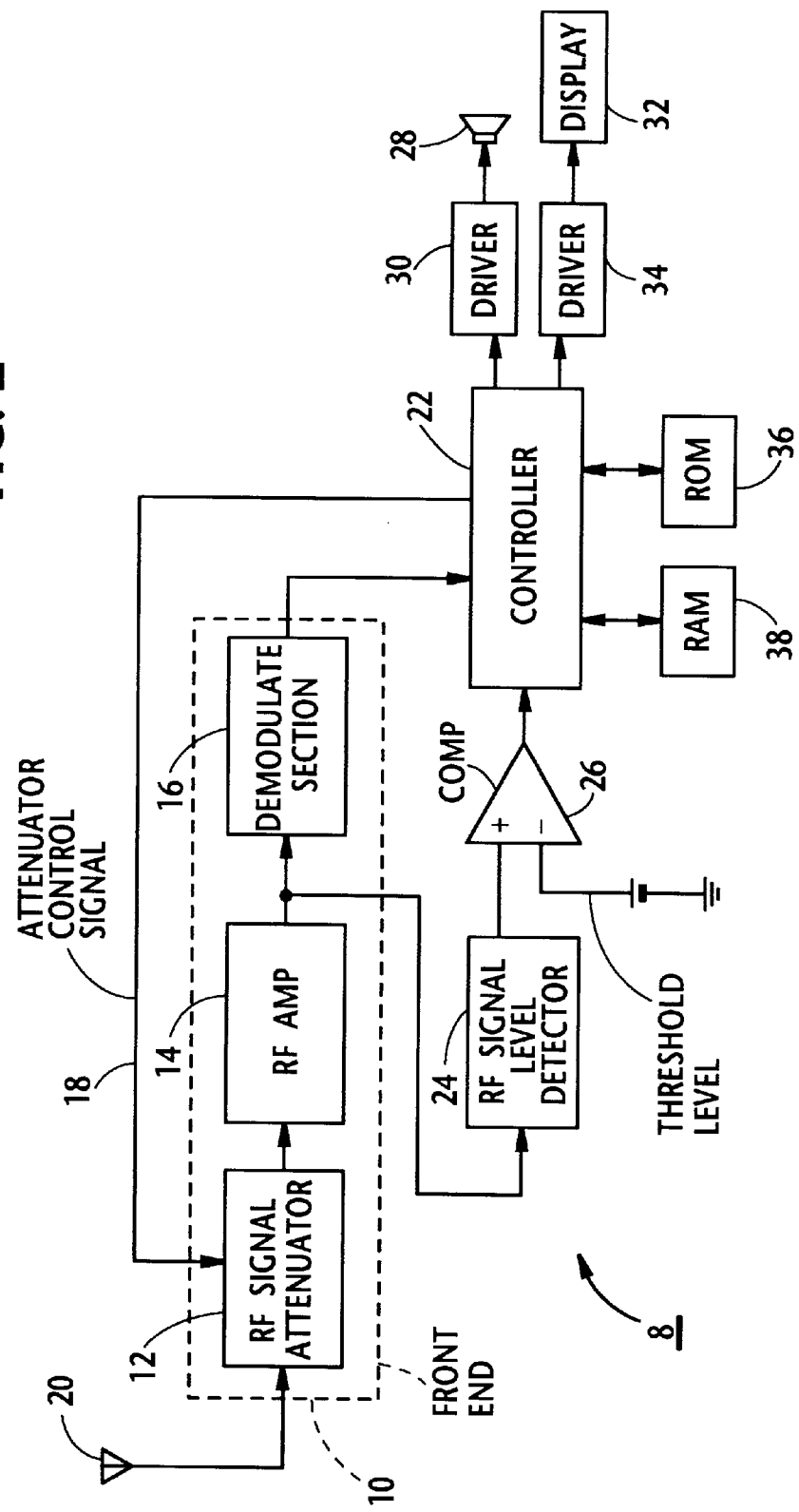
FIG. 2 is a block diagram schematically showing a pager embodying the present invention.

FIG. 2 is a block diagram schematically showing a radio pager, depicted by numeral 8, which embodies the present invention.

As shown in FIG. 2, a front end 10 is provided which includes an RF attenuator 12, an RF amplifier 14 and a demodulate section 16. A code-modulated signal is applied to the front end 10 via an antenna 20. The attenuator 12 is rendered operative or inoperative under control of an attenuator control signal 18 applied thereto from a controller 22 which includes a central processing unit (CPU) (not shown).

The output of the RF amplifier 14 is applied to an RF signal level detector 24 which, in response to the magnitude of the output of the amplifier 14, produces a corresponding direct current (DC) signal.

A comparator 26 compares two DC levels; one is the output of the detector 24 and the other is a threshold level which has been determined empirically or based on field search (for example). The comparator 26 issues a high logic level (for example) when the output of the detector 24 exceeds the threshold level, and, otherwise generates a low logic level. The logic level (high or low) thus generated is applied to the controller 22.

The demodulate section 16 includes, although not shown in FIG. 2, a frequency converter, an IF amplifier, and a discriminator. The demodulate section 16 reproduces a base band signal which is applied to the controller 22.

If the controller 22 establishes bit sync and detects a word sync (SC) code, the controller 22 searches for an identifying address code (depicted by ID code) directed to the pager 8. This is done by comparing the incoming ID code with a subscriber's unique code prestored in a PROM (not shown). If the incoming ID code coincides with the subscriber's unique code, the controller 22 energizes a speaker 28 via a driver 30. Further, when a message is included in the transmission, the controller 22 induces the message to appear on the display 32 by way of a display driver 34.

A ROM 36 stores a program for controlling the overall operation of the pager 8, while a random access memory (RAM) 38 provides a work space for temporarily storing a message transmitted (for example).

The operations of the pager 8 according to the present invention are discussed with reference to a flow chart of FIG. 3.

In FIG. 3, the first step 48 of the routine comprises the pager being switched on. Following this, at step 50, the controller 22 is initialized such as to implement preamble searches each for a time period corresponding to "a" preamble bits (36 preamble bits for example). At step 52 the attenuator 12 is rendered inoperative (viz., de-energized) and thus, an incoming signal passes without attenuation.

Under such initial conditions, at step 54, a first preamble search is implemented for the time period corresponding to the "a" preamble bits. It is to be noted that preamble searches are intermittently carried out every one minute or 30 seconds (merely for example). Between the two consecutive preamble searches, the routine following step 54 is executed. When the controller 22 establishes bit sync at step 56, the routine flows to step 58 wherein it is determined whether or not a word sync code (SC code) is detected. If the answer is affirmative then the program goes to step 60. Otherwise, the routine goes back to step 54 and waits for a subsequent preamble search.

At step 60, a check is made to determine if a calling signal which was being received has terminated or not. It is usual that the calling signal continues immediately after the detection of the word sync SC code. Thus, the routine goes to step 62 wherein it is determined if the ID code coincides with the subscriber's unique code. If the outcome of the enquiry performed in step 62 is "no", the routine loops back through steps 60 and 62. If the answer is positive at step 62 (viz., ID has been detected), the routine proceeds to step 64 whereat a subscriber is alerted and a message (if any) is displayed. Thereafter, the routine returns to step 54.

At step 60, if a calling signal is terminated, the routing goes to step 66 whereat a check is made to determined if the attenuator 12 is switched on. In this case, the attenuator 12 has not yet been switched on (energized). Thus, the routine goes to step 54.

On the other hand, if the answer is negative at step 56, the routine proceeds to step 70 whereat a check is made to determine if the output of the comparator 26 exceeds the threshold level (viz., high). If the answer is negative then the routine returns to step 54. In such a case, it is presumed that neither a desired nor an undesired frequency channel is being applied to the pages.

Conversely, if the outcome of enquiry performed at step 70 is positive (viz., the output of the comparator 26 exceeds the threshold level), a check is made to determine if the attenuator 12 has already been switched on (viz., energized). In the instant case, the attenuator 12 has not yet been switched on and thus, the routine goes to step 74 whereat the attenuator 12 is rendered operative via energization. Immediately thereafter, a timer (not shown in FIG. 2) included in the controller 22 is turned on, and the preamble search is extended by "b" bits which are preferably equal to "a" bits (viz., 36 bits) or more. Following this, a check is again made to determine it bit sync is established at step 78.

In the above, the situation wherein the output of the comparator 26 exceeds the threshold level at step 70, implies one of the following two possible cases or situations:

CASE 1—a pager has received both desired and undesired frequency signals and has failed to establish bit sync due to intermodulation noise.

CASE 2—a pager has received only an undesired frequency with strong electric field strength.

If the answer at step 78 is negative indicating the absence of bit sync, the routine goes back to step 54. It is highly probable that this case is the above mentioned CASE 2 type in that bit sync was not established irrespective of the fact that both the energization of the attenuator 12 and the extension of preamble search were carried out. On the other hand, if the answer at step 78 is positive (viz., bit sync has been established), the routine proceeds to step 58. Steps which follow step 58 have been described. However, it is to be noted that in this instance the attenuator 12 has been switched on (viz., activated) and thus, if the calling signal in question terminates (step 60), the routine goes to step 67 via step 66. If the preset time duration (30 minutes or one hour (for example)) has not elapsed, the routine returns to step 56 for further preamble search. On the contrary, if the preset time duration has already elapsed, the attenuator 12 is switched off whereby an incoming signal is applied to the RF amplifier 14 without attenuation.

After the attenuator 12 is switched on at step 74 and the timer starts at step 75, when the routine proceeds to step 72, a check is made to determine at step 84 if the timer has counted up. If the answer is negative at step 84, the routine returns to step 54 for further preamble search. Otherwise, the attenuator 12 is de-energized and thus allows an incoming signal to pass therethrough without attenuation. Subsequently, the routine returns to step 54.

It is understood that the present invention is particularly preferable when applied to an asynchronous type paging. That is, unlike a synchronous type paging, an asynchronous type paging is always required to attain bit sync before acquiring a message.

It will be understood that the above disclosure is representative of only one possible embodiment of the present invention and that the concept on which the invention is based is not specifically limited thereto.

What is claimed is:

1. A method of controlling a pager operation, comprising the steps of:
   (a) executing a plurality of preamble searches at predetermined intervals;
   (b) attempting to establish bit sync during each of said preamble searches;
   (c) determining if an incoming radio frequency (RF) signal exceeds a predetermined level if bit sync is not established at a preamble search, said incoming RF signal being an asynchonous signal; and
   (d) activating an attenuator for a first predetermined time period for attenuating incoming RF signals, and extending said preamble search by a second predetermined time period for further determining if bit sync is established, if said incoming RF signal exceeds said predetermined level;
   (e) entering into a subsequent pager identification search mode if bit sync is established at step (d); and
   (f) continuing to attempt to establish bit sync at subsequent preamble searches if bit sync is not established at step d), wherein said first predetermined time period is a time period of sufficient length for at least three subsequent preamble searches to take place, wherein the steps a) and b) are initially performed with the attenuator deactivated, wherein, if bit sync is not established in the step f) for a time period longer than the first predetermined time during which time the attenuator was activated, the attenuator is deactivated once again and the method returns to the step a) to reattempt to establish bit sync, and wherein the attenuator is deactivated once again only if: i) bit sync is not established, and ii) another incoming RF signal received after the first predetermined period of time exceeds the predetermined level.

2. A pager comprising:

an antenna;

an attenuator coupled to said antenna, said attenuator initiating attenuation of a signal received from said antenna for a first predetermined time period in response to a control signal, said signal being an asynchronous signal;

an amplifier coupled to amplify output of said attenuator;

a signal level monitor coupled to said amplifier, said signal level monitor-determining if output of said amplifier exceeds a predetermined level;

a demodulator, coupled to said amplifier, for reproducing a base band signal; and a controller coupled to said signal level monitor and said demodulator, said controller being responsive to establishment of bit sync during one of a plurality of intermittently executed preamble searches, wherein said controller, if bit sync is not established at a preamble search and if said signal level monitor indicates that the output of said amplifier exceeds said predetermined level, applies said control signal to said attenuator, and simultaneously extends a duration of the preamble search by a second predetermined time period for further determining if bit sync is established, wherein said first predetermined time period is a time period of sufficient length for at least three subsequent preamble searches to take place, wherein the controller initially attempts to establish bit sync with the attenuator deactivated, wherein, if bit sync is not established after the initial attempts to establish bit sync and after the first predetermined time has elapsed during which bit sync was attempted to be established with the attenuator activated, the attenuator is deactivated once again so as to reattempt to establish bit sync, and wherein the attenuator is deactivated once again only if: i) bit sync is not established, and ii) another incoming RF signal received after the first predetermined period of time exceeds the predetermined level.

* * * * *